United States Patent [19]

Haraguchi et al.

[11] Patent Number: 4,466,719
[45] Date of Patent: Aug. 21, 1984

[54] WIND-UP DEVICE FOR CAMERA

[75] Inventors: Shosuke Haraguchi; Masanori Uchidoi, both of Kanagawa; Yoshihiro Shigeta, Tokyo; Ryoichi Yoshikawa, Kanagawa; Yoichi Tosaka, Tokyo, all of Japan

[73] Assignee: Canon Kabushiki Kaisha, Tokyo, Japan

[21] Appl. No.: 494,628

[22] Filed: May 16, 1983

Related U.S. Application Data

[63] Continuation-in-part of Ser. No. 295,327, Aug. 24, 1981, abandoned.

[30] Foreign Application Priority Data

Aug. 28, 1980 [JP] Japan ............................. 55-118619

[51] Int. Cl.³ ...................... G03B 1/18; G03B 17/42
[52] U.S. Cl. .......................... 354/173.11; 354/206; 354/214

[58] Field of Search ........ 354/173.1, 173.11, 204–206, 354/212–214; 242/71.5, 71.6; 355/48

[56] References Cited

U.S. PATENT DOCUMENTS 1,966,348  7/1934  Hughey ................................ 355/48
2,161,391  6/1939  Schubert ........................... 242/71.5
4,311,377  1/1982  Matteson ........................... 354/217

Primary Examiner—William B. Perkey
Attorney, Agent, or Firm—Toren, McGeady and Stanger

[57] ABSTRACT

A camera which is provided with a motor for driving a wind-up mechanism to perform film feeding and shutter charging and which is arranged to have photographing actions carried out one after another upon completion of the film feeding and shutter charging, a wind-up device has a switch which is arranged to force the wind-up mechanism into completing the winding up action thereof by means of the motor in response to depression of a rewinding button.

8 Claims, 4 Drawing Figures

WIND-UP DEVICE FOR CAMERA

CROSS REFERENCE TO RELATED APPLICATIONS

This is a continuation-in-part application of copending application Ser. No. 295,327, filed Aug. 24, 1981, now abandoned.

BACKGROUND OF THE INVENTION

1. Field of the Invention

This invention relates to an improvement on a single-lens reflex camera incorporating a motor therein.

2. Description of the Prior Art

A single-lens reflex camera having a motor incorporated therein is arranged such that depression of a shutter button causes a release action to begin. Upon completion of the release action, a sequence of photographing actions, such as a mirror-up action, an automatic stopping action, shutter travelling, and quick returning actions on the mirror and an automatic stop, are carried out one after another in response to a signal produced upon completion of the preceding action. After completion of the photographing actions, a winding action is performed by the motor. Accordingly, if the shutter fails to operate in a normal manner, no signal representative of completion of the travel of a trailing shutter curtain would be produced. Then, the sequence of the actions of the camera would stop half-way. The camera would stop operating with the mirror left in a state of being lifted up or with the shutter left in an open state. Such an abnormality certainly gives a warning to the operator of the camera. However, with the mirror left in the lifted state, shutter blades might be damaged by sunlight. If the film is rewound when the shutter is left open, the whole film portion which has been exposed in photograph taking operations might be exposed to light and thus might be ruined. Furthermore, even when the shutter normally operates, if the film comes to its end half-way in a film winding process and is then rewound from that position, a new film which is loaded in the camera would have a first portion thereof wound-up to a different extent than other films. This results in inconstancy to the extent that the initial film winding is to be done without photographing. Such inconstancy is undesirable.

SUMMARY OF THE INVENTION

It is a general object of the present invention to provide a wind-up device for a camera arranged to solve the problem of the conventional single-lens reflex camera described above. The wind-up device, according to the invention, has the internal mechanism of the camera positioned by depressing a rewind button to completely perform a wind-up action without feeding the film, when the shutter fails to operate in a normal manner or when the film comes to its end half-way through a winding action and the winding action thus comes to a stop half-way.

The above and further objects, features and advantages of the present invention will become apparent from the following detailed description of a preferred embodiment thereof taken in connection with the accompanying drawings.

DETAILED DESCRIPTION OF THE PREFERRED EMBODIMENT

Figure 1:
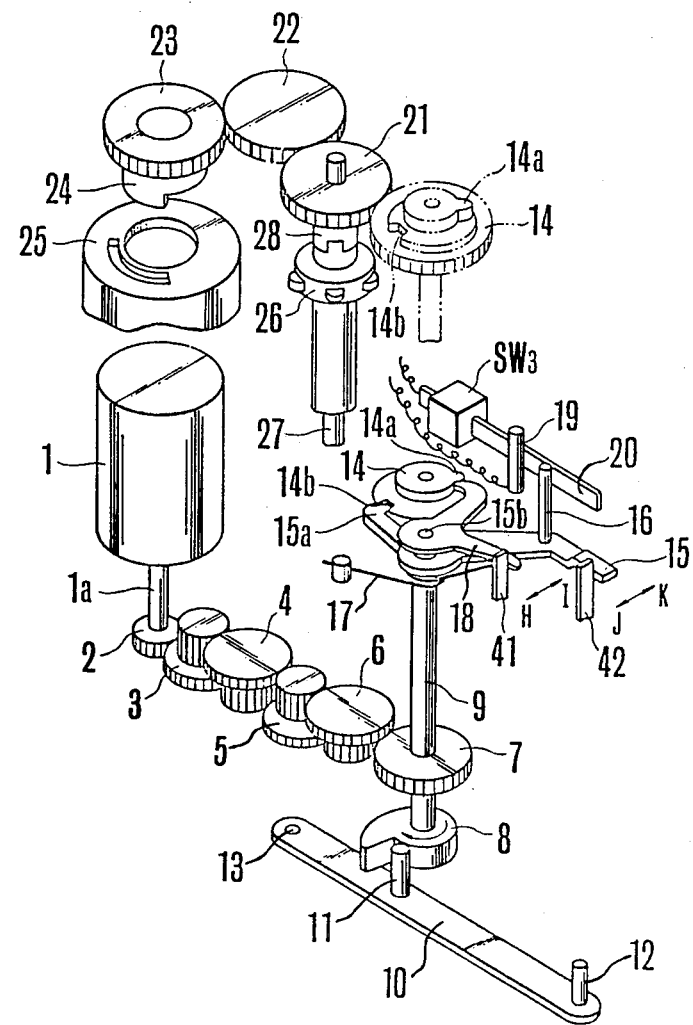
FIG. 1 is a perspective view in partially exploded relation of a wind-up mechanism of a single-lens reflex camera in a preferred embodiment of the invention.

Referring now to FIG. 1, there is shown preferred embodiment of a wind-up mechanism of a single-lens reflex camera, in which the wind-up mechanism is provided with a wind-up motor 1. A gear 2 is secured to the shaft 1a of the motor 1. The motor 1 is arranged to drive a cam shaft 9 through the gear 2 and reduction gear wheels 3, 4, 5, 6 and 7. The shaft 9 has a charge cam 8 secured to the lower end thereof. One turn of the cam 8 charges a shutter, a mirror and an automatic stop mechanism (not shown) through an interlocking lever 10. The interlocking lever 10 is provided with a pivot 13, a pin 11 which engages the cam 8, and a pin 12 which is provided for effecting the charge. On the upper end of the cam shaft 9, in a position shown by a two-dot chain line in the drawing, there is provided a winding stop gear 14, which is secured to the upper end part of the shaft 9. The gear 14 is provided with a mirror returning projection 14a, which is formed on a disc arranged in one unified body with the gear 14, and is provided also with a notch 14b which stops winding. A winding stop lever 15 is provided with a tip 15a and is pivotally supported by a shaft 15b in such a way as to allow tip 15a thereof to engage and disengage with the notch 14b. The rear end of the lever 15 engages a mirror-up signal lever 42.

The winding stop lever 16 has a pin 16 positioned thereon. The pin 16 is arranged to engage a contact piece 20 of a winding completion signal switch SW3 to cause the switch SW3 to make and break electrical contact between a contact piece 20 and a fixed contact 19. A mirror return lever 18 is pivotally supported by the shaft 15b. In a winding completed condition, the front end of the mirror return lever 18 is in contact with the above stated projection 14a, while the rear end thereof engages and is urged by a mirror release lever 41 in the direction of I.

A sprocket gear 21 engages the gear 14. The apparatus includes an idler gear 22; a spool gear 23; a friction spring 24 which embraces the shaft of the spool gear 23; and a spool 25 contains therein a friction motor coupled to the spool gear 23 through the friction spring 24. A sprocket 26 and the spool 25 rotate a predetermined angular extent to move forward one frame portion of film when the cam shaft 9 makes one turn.

Figure 2:
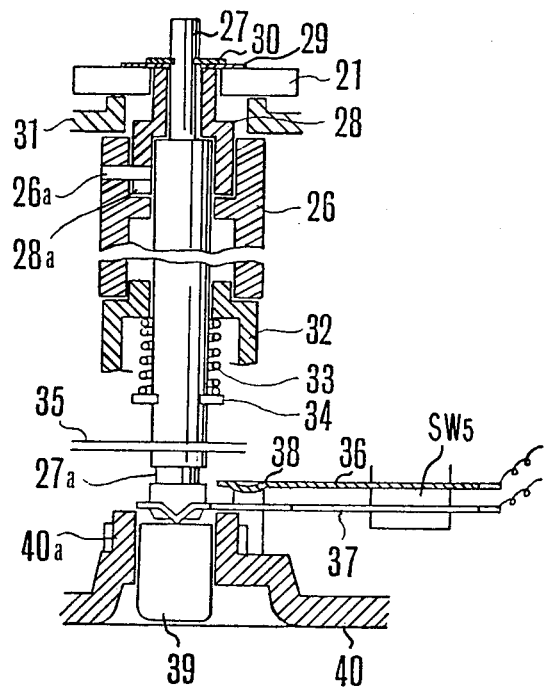
FIG. 2 is a sectional view of the sprocket arrangement shown in FIG. 1.

In FIG. 2, which is a sectional view showing the details of the sprocket arrangement shown in FIG. 1, the sprocket gear is identified by the numeral 21. A clutch 28 is rotatable together with the gear 21 and is movable relative to the gear 21 in the axial direction. The clutch 28 is provided with a clutch groove 28a which engages and disengages a pin 26a of the sprocket 26. With the clutch 28 thus arranged to move up and down together with a sprocket shaft 27, the gear 21 and the sprocket 26 engage and disengage each other. The apparatus also includes a washer 29; a clamping washer 30; bearings 31 and 32 secured to the camera body (not shown); a spring 33, which is arranged to return the sprocket shaft 27 downward; and a spring receiving clamping washer 34. The sprocket shaft 27 is provided with a groove 27a which engages a holding lever 35.

Figure 3:
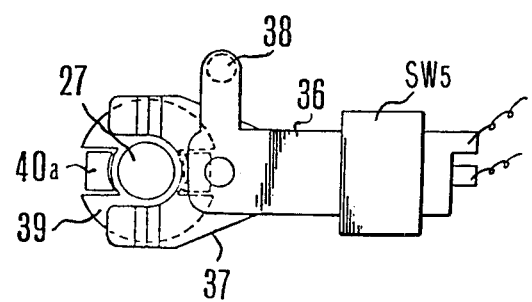
FIG. 3 is a plan view of a switch arranged to operate in association with a rewinding button shown in FIG. 2.

A rewinding button 39, which is disposed beneath the sprocket shaft 27, is guided by a projection 40a provided on a bottom lid 40. The rewinding button 39 is slidable up and down along the projection 40a. Referring now to FIG. 3, a moving contact piece 37 of a switch SW5 is in contact with the upper surface of the rewinding button 39. Meanwhile, a fixed contact piece 36 of the switch SW5 is mounted in a position above the winding button 39 by a contact piece receiver 38.

Figure 4:
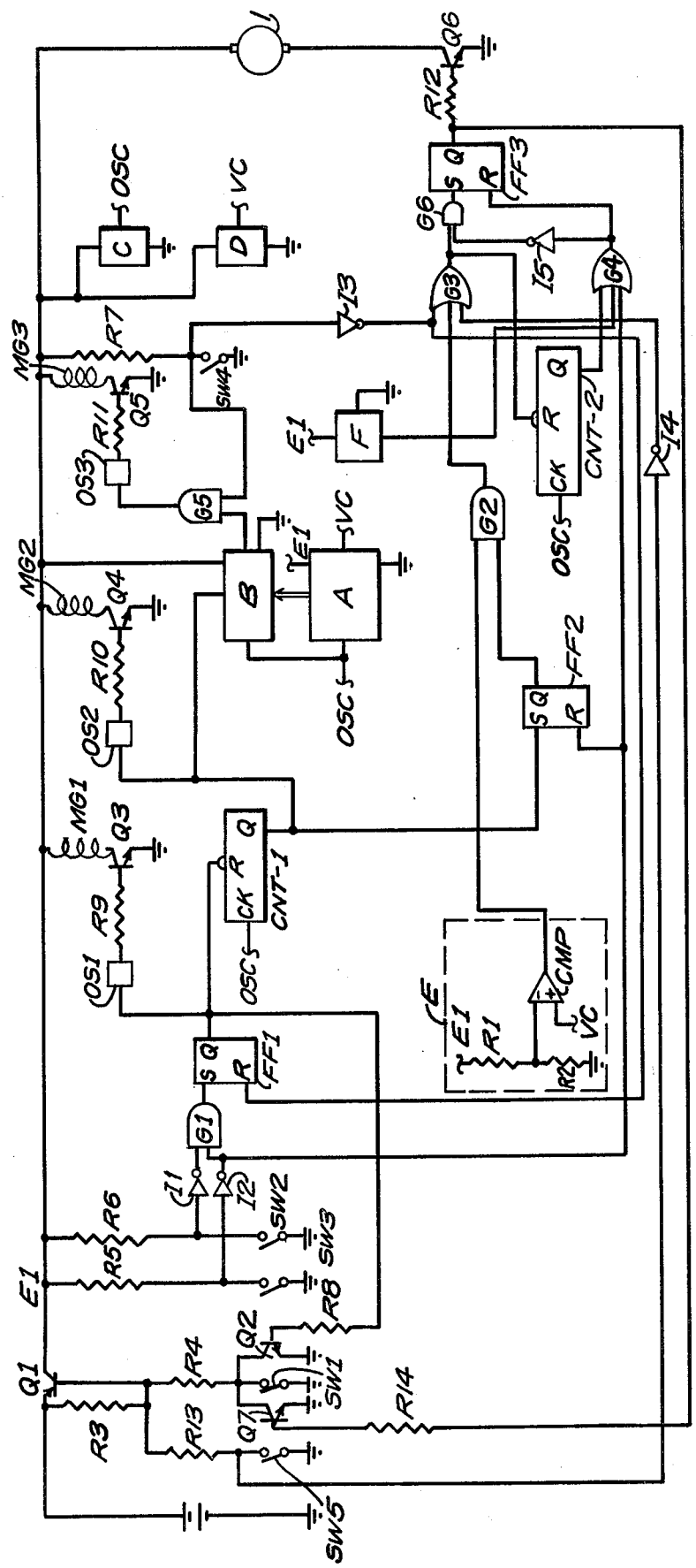
FIG. 4 is a circuit diagram showing the control circuit of a single-lens reflex camera which is provided with the wind-up mechanism shown in FIG. 1.

The camera, having the wind-up device arranged as shown in FIG. 1, is provided with a control circuit which is as shown in FIG. 4. In FIG. 4, there are shown a power source battery BA and a light measuring switch SW1 which is interlocked with a shutter button (not shown) and is arranged to be turned on by a first depression of the shutter button. When the light measuring switch SW1 is turned on, a power supply switching transistor Q1 is turned on thereby. With the transistor Q1 turned on, a power supply voltage E1 is impressed on each circuit. Switching transistors Q2 and Q7 are also provided for holding the power supply. A block A represents a light measurement and information computing circuit consisting of a light measuring circuit, an information setting circuit, etc. which are well known. A block B represents a shutter control circuit, which serves to set shutter time information coming from the information computing circuit A. A block C represents a clock pulse generating circuit. A block D represents a constant voltage generating circuit. A block E represents a power source voltage detecting circuit. The voltage detecting circuit E is provided with a comparator CMP, which is arranged to compare a divided voltage obtained from the resistors R1 and R2 with a constant voltage VC obtained from the constant voltage generating circuit D. Another block F represents a reset pulse generating circuit, which is arranged to produce a reset pulse when the power supply voltage E1 is impressed thereon. Flip-Flop FF3 is reset by a reset pulse generating circuit F in cooperation with an OR gate G4.

A switch SW2 is turned on by a second depression of the shutter button. There is also provided the winding completion detecting switch SW3 which is arranged to be turned on upon completion of winding. With the detecting switch SW3 turned on, a signal is produced to reset the Flip-Flop FF3 through an inverter I2. Two input terminals of an AND gate G1 are connected to those switches SW2 and SW3 through I1 and I2. The output terminal of the AND gate G1 is connected to the set input terminals S of the flip-flop FF1. To the reset terminal R of the Flip-flop FF1, the output of the inverter I3 is added. A signal produced from this Flip-Flop is applied to a monostable circuit OS1, the reset terminal R of a counter CNT-1 and the transistor Q2 through a resistor R8. The output terminal of the monostable circuit OS1 is connected through a resistor R9 to the base of the transistor Q3, which is connected to an electromagnet MG1 provided for effecting a release. The output terminal Q of the counter CNT-1 is connected respectively to a monostable circuit OS2, to the shutter control circuit B and to the set input terminal S of the Flip-Flop FF2. The monostable circuit OS2 has the output terminal thereof connected through a resistor R10 to the base of a transistor Q4, which is connected to an electromagnet MG2 provided for controlling a leading shutter blade. The output terminal of the shutter time control circuit B is connected to the base of a transistor Q5 through an AND gate G5, a monstable circuit OS3 and a resistor 11. The transistor Q5 is in turn connected to an electromagnet MG3 provided for controlling a trailing shutter blade. A switch SW4 is provided, which turns on upon completion of travel of the trailing shutter blade. The switch SW4 is connected to the AND gate G5. Another switch SW5 is interlocked with the rewinding button 39. The output of the comparator CMP of the power source voltage detecting circuit E and the output of the output terminal Q of the Flip-Flop FF2 are applied to an AND gate G2. Meanwhile, an OR gate G3 has a signal which corresponds to the switching action of the switch SW4 and comes through the inverter I3 and applies the output of the AND gate G2 thereto respectively. The output of the OR gate G3 is applied to the reset terminal R of a counter CNT-2 and to an AND gate G6 respectively. The output of the output terminal Q of the counter CNT-2 is applied to an OR gate G4 together with the output of the inverter I2 and that of the reset pulse generating circuit F. The output of the OR gate G3 and the output of the OR gate G4 which comes through an inverter I5, are respectively applied to the AND gate G6. The output of the AND gate G6 is applied to the set input terminal of a Flip-Flop FF3. The Flip-Flop FF3 has the output terminal Q thereof connected through a resistor R12 to a transistor Q6 which is connected to a motor 1. Furthermore, the output of the Flip-Flop FF3 is applied to the base of a transistor Q7 through a resistor R14. The clock pulses produced from the above stated clock pulse generating circuit C are arranged to be applied to the counters CNT-1 and CNT-2, to the information computing circuit A and to the shutter control circuit B respectively. A constant voltage VC from the constant voltage generating circuit D is applied also to the information computing circuit A as well as the comparator CMP. Reference symbols R3 to R7 and R13 indicate resistors. The above described arrangement operates in the following manner:

(i) When the shutter operation and winding are performed normally:

After completion of a winding operation by the wind-up mechanism shown in FIG. 1, depression of the shutter button causes the switch SW1, which is interlocked with the shutter button, to turn on. Then, power is supplied to the circuit. With the power supply thus effected, the reset pulse generating circuit F produces reset pulses for initial setting. The Flip-Flop FF3 is reset by the reset pulses. The switch SW3 is disposed in the on position in the winding completed condition. Therefore, a signal which is produced when this switch SW3 is on, causes the Flip-Flop FF2 to be reset through the inverter I2. With the Flip-Flops FF2, FF3 thus reset, the level of the output of the output terminal Q of each Flip-Flop F2, F3 becomes low. The information computing circuit A sets a shutter time value in the shutter time control circuit B. When the shutter button is further depressed, the switch SW2 turns on. Since the winding completion detecting switch SW3 is also on in the winding completed condition, the signals from the switches SW2 and SW3 are applied to the AND gate G1 through the inverters I1 and I2. In other words, the level of each input to the AND gate G1 becomes high. This causes the output of the AND gate G1 to change from a low level to a high level. This change in turn causes the level of the output Q of the Flip-Flop FF1 to change from a low level to a high level causing the following actions (1), (2) and (3):

(1) The high level signal of the Flip-Flop FF1 triggers the monostable circuit OS1. The level of the output of the monostable circuit OS1 becomes high for a predetermined period of time. This turns on the transistor Q3 to effect power supply to the release magnet coil MG1.

(2) The high level signal of the Flip-Flop FF1 causes the transistor Q2 to turn on through the resistor R8 in such a way as to have the transistor Q1 not turn off, even when the switch SW1 is turned off (thus holding the power supply from the power source).

(3) The output of the Flip-Flop FF1 causes the level of a reset input to the counter CNT-1 to change from a low level to a high level. The counter CNT-1 thus begins its counting action.

At this stage, the power supply to the release magnet coil MG1 actuates a mechanism which does not lift up the mirror. In association with this, the mirror-up signal lever 42 operates in the direction of K, as shown in FIG. 1. The winding stop lever 15 turns its tip 15a to disengage from the winding stop notch 14b. The winding stop arrangement is released by this disengagement. Concurrently with this, the switch SW3 turns off.

When the counter CNT-1 has counted a predetermined number of pulses, the level of the output Q of the counter CNT-1 changes from a low level to a high level. This then brings about the following actions (4), (5) and (6):

(4) The high level signal of the counter CNT-1 triggers the monostable circuit OS2. The level of output of the monostable circuit OS2 then becomes high for a predetermined period of time. This change in turn causes the transistor Q4 to turn on. With the transistor Q4 turned on, the magnet coil MG2 for controlling the leading shutter blade is energized causing the leading shutter blade, which is not shown, to travel.

(5) The output of the counter CNT-1 changes the level of the set input S of the Flip-Flip FF2 to a high level to have the Flip-Flop FF2 set thereby. However, since the output of the power source voltage detecting circuit E remains at a low level as long as the power source voltage is above a predetermined value, the output Q of the AND gate G2 remains at a low level.

(6) The high level signal of the counter CNT-1 causes the shutter time control circuit B to begin counting the shutter time. After the lapse of a predetermined shutter time, the value of which is received from the information computing circuit A, the level of the output of the shutter time control circuit B changes from a low level to a high level. Furthermore, since the trailing shutter blade travel completion switch SW4 is open at this point in time, the input of the AND gate G5 are at a high level. In other words, the AND gate G5 has high inputs and the output thereof changes from a low level to a high level. This high level output triggers the monostable circuit OS3. The level of the output of the monostable circuit OS3 then becomes high to render the transistor Q3 operative. Accordingly, the magnet coil MG3 for controlling the trailing shutter blade is energized to cause the trailing shutter blade to travel. Upon completion of the travel of the trailing shutter blade, the winding start switch SW4 turns on. Turning on of the switch SW4 causes the OR gate G3 to receive a high level signal through the inverter I3. The level of the output of the OR gate G3 then becomes high. Also, the signal generated by the turning on of the switch SW4 is added to the reset terminal R of the Flip-Flop FF1 through the inverter I3 to reset the Flip-Flop FF1.

This output of the OR gate G3 makes the level of the reset input R of the counter CNT-2 high causing the counter CNT-2 to begin counting. This counter CNT-2 controls the power supply time for the motor. The counter produces a signal to stop the power supply to the motor when a winding operation is not completed within a predetermined period of time.

As for the three inputs to the OR gate G4, the output Q from the counter CNT-2 and the output of the circuit F, which produce reset pulses when the power source is switched on, are at low levels while, when the winding completion switch SW3 is off, the signal, which is another input and is representative of the off state of the switch SW3, also becomes low level through the inverter I2. Accordingly, the level of the output Q of the OR gate G4 is low while the AND gate G6 receives a high level input through the inverter I5. Furthermore, since the output level of the OR gate G3 is also high, the output level of the AND gate G6 becomes high. Therefore, the level of the set input terminal S of the Flip-Flop FF3 becomes high and that of the output Q of the Flip-Flop FF3 also becomes high. The high level signal thus produced from the Flip-Flop FF3 turns the transistor Q6 on to supply power to the motor 1 and winding begins. At the initial stage of winding, the mirror releasing projection 14a, which is shown in FIG. 1, pushes the mirror return lever 18 turning it clockwise on the shaft 15b. The clockwise rotation of the lever 18 causes the release lever 41 to move in the direction of H thus releasing the mirror from being locked in a lifted up position. This allows the mirror to come down. A charging action is performed by the charge cam 8 through the lever 12 interlocked therewith. When the winding stop gear shaft 9 makes one turn from the starting point, the force of the spring 17 causes the winding stop lever 15 to fall and engage the winding stop notch 14b. Concurrently, the winding completion detecting switch SW3 turns on. The signal produced resets the Flip-Flop FF2 through the inverter I2 and, at the same time, also resets the Flip-Flops FF1 and FF3. The power supply to the motor 1 is stopped upon winding completion.

With winding thus completed in the normal manner, another depression on the shutter button repeats the sequence of actions for another photographing operation.

(ii) When the length of time required for winding is longer than a predetermined length of time, the operation differs from the operation of the normal case (i) above in the following manner:

When the output of the OR gate G3 changes to a high level, i.e., concurrently with the start of power supply to the motor 1, the counter CNT-2 begins to count. After a predetermined length of time, the output Q of the counter CNT-2 changes from low to high level. The high level signal thus produced resets the Flip-Flop FF3 to stop the power supply to the motor 1. The above stated abnormality takes place either when film feeding is stopped by stretching the end of the film or when film feeding is greatly retarded for some reason. In such a case, if the power supply to the motor is stopped at the initial stage of winding, or before the mirror return lever 18 is actuated by the mirror returning projection 14a, the mirror would be left in the lifted up state and the shutter blades might be damaged by the sunlight. In this embodiment of the invention, this problem is solved by the provision of a switch SW5, which is interlocked with the rewinding button 39.

(iii) When the trailing shutter blade fails to operate in a normal manner, the operation differs from the operation in the normal case (i) in the following manner: The winding start switch SW4, which is interlocked with the trailing shutter blade, remains off and does not turn on when the trailing shutter blade does not operate in a normal manner. Accordingly, the output of the inverter I3 remains at a low level. The output of the OR gate G3 therefore does not change and also remains at a low level. The Flip-Flop FF3 is therefore not set. Since the level of the output of the output terminal Q of the Flip-Flop FF3 thus remains low, the motor driving transistor Q6 is off and no power is supplied to the motor 1. In other words, the mirror is left in the state of being lifted up. This gives a warning to the camera operator that something is wrong. Under this condition, however, the trailing shutter blade does not complete its travel and only the leading shutter blade has travelled. The trailing shutter blade is stopped with the shutter left open. Film rewinding under this condition would expose the whole film to light and ruin each frame of the film.

To solve the problems resulting from these malfunctions (ii) and (iii), the motor power supply is effected by depressing the rewinding button with the following results:

When the rewinding button 39 is depressed, the switch SW5, which is interlocked with the rewinding button, turns on as described in the foregoing with reference to FIGS. 2 and 3. Clutch 28 then disengages the sprocket 26 from the gear 21 placing it in a free state. When the rewinding button 39 is released from the depressing operation performed by a finger, the switch SW5 turns off. Meanwhile, however, the sprocket shaft 27 is held by the holding lever 35 keeping the sprocket 26 in a free state. When the switch which is interlocked with the rewinding button turns on, the signal, which is produced by turning on the switch SW5, is inverted at the inverter I4 to become a high level signal. This high level signal is impressed on the OR gate G3 to make the output level of the OR gate G3 high. Under condition of the malfunctions (ii) and (iii), the winding completion detection switch SW3 is off. Therefore, the output of the OR gate G4 is at a low level. This low level signal is inverted at the inverter I5 to let the AND gate G6 have a high level input. In other words, the level of input of the set input terminal S of the Flip-Flop FF3 becomes high. This causes the Flip-Flop FF3 to produce a high level output, which causes the motor driving transistor Q6 and the power source holding transistor Q7 to turn on starting the power supply to the motor 1. Since the sprocket 26 is freed even in the case of malfunction (ii), the motor 1 is rotated by the power supply. When the winding stop gear shaft 9 has rotated one turn, the winding completion detecting switch SW3 stops the power supply to the motor. This arrangement ensures that the mirror is moved down. The shutter is brought back into a charged state and is closed without fail. Therefore, the unintended exposure to light of the whole film because of malfunctions (ii) and (iii) can be consistently prevented.

In a normal winding operation, the winding completion detecting switch SW3 has already turned on when the rewinding button is depressed. Therefore, the signal produced by turning on the switch SW3 causes the OR gate G4 to have a high level input through the inverter I2. Then, the high level signal of the OR gate G4 is inverted by the inverter I5 and is applied to the AND gate G6 to inhibit it. Therefore, the Flip-Flop FF4 is not set and the winding motor does not receive any power supply.

In accordance with the present invention, the camera having a driving motor effects the power supply to the motor forcedly making the camera complete a winding operation only when a malfunction takes place. With the invented arrangement, the shutter blades damage and the unintended exposure of the whole film can be totally prevented. The use of the invention for a camera provided with a driving motor having a winding for a light load produces a substantial advantage. A further advantage of the invention is that, at the time of loading, the camera is always in a state of having completed a winding operation, so that initial film feeding without photographing can be done to an unvarying extent.

What is claimed is:
1. A wind-up device for a camera, comprising:
   driving means for effecting film winding and shutter charging;
   control means for controlling the driving action of said driving means, said control means being arranged to bring said driving means into a driving state when a first signal is applied thereto and to render the driving means incapable of driving when a second signal is applied;
   first signal generating means for producing said first signal upon completion of an exposure effecting operation;
   second signal generating means for producing said second signal upon completion of a winding operation;
   switch means for causing said first signal generating means to produce the first signal therefrom irrespective of completion of the exposure effecting operation; and
   operation means for causing said switching means to perform the switching action thereof.
2. A device according to claim 1, wherein said operation means is a rewinding button.
3. A device according to claim 2, further including:
   a sprocket for film winding, said sprocket being provided with a clutch operated by a driving force of said driving means either to permit or to inhibit said film winding, said clutch being interlocked with said rewinding button to inhibit said film winding in response to an operation on the rewinding button.
4. A device according to claim 1, wherein said driving means is a motor.
5. A wind-up device for a camera, comprising:
   a wind-up mechanism arranged to perform film winding and shutter charging;
   driving means for driving said wind-up mechanism;
   a sprocket operated by said wind-up mechanism for performing film winding, said sprocket being provided with a clutch for transmission of or releasing the transmission of the operation of said wind-up mechanism;
   a rewinding operation member which releases the transmission by said clutch when operated;
   control means for controlling the driving action of said driving means, said control means being arranged to bring the driving means into a driving state when a first signal is applied thereto and to render the driving means incapable of driving when a second signal is applied;

first signal generating means for producing said first signal upon completion of an exposure effecting operation;

second signal generating means for producing said second signal upon completion of a winding operation; and switch means for causing said first signal generating means to produce the first signal therefrom irrespective of completion of the exposure effecting operation, said switch means being arranged to be caused to perform the switching action thereof by said rewinding operation member.

6. A device according to claim 5, wherein said first signal generating means is provided with a switch for detecting completion of a shutter operation.

7. A device according to claim 6, wherein said first signal generating means is provided with gate means which has said switch and said switch means connected to the input terminals thereof.

8. A device according to claim 5, wherein said first signal generating means and said second signal generating means are provided with a common Flip-Flop.

* * * * *